(12) United States Patent
Martin et al.

(10) Patent No.: US 9,091,176 B2
(45) Date of Patent: Jul. 28, 2015

(54) TURBOMACHINERY COMPONENT COOLING SCHEME

(75) Inventors: Thomas J. Martin, East Hampton, CT (US); Alexander Staroselsky, Avon, CT (US); Mark F. Zelesky, Bolton, CT (US); Thomas N. Slavens, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 571 days.

(21) Appl. No.: 13/488,831

(22) Filed: Jun. 5, 2012

(65) Prior Publication Data
US 2013/0323079 A1  Dec. 5, 2013

(51) Int. Cl.
*F01D 5/18* (2006.01)

(52) U.S. Cl.
CPC ............... *F01D 5/186* (2013.01); *F01D 5/187* (2013.01); *F01D 5/18* (2013.01); *F05D 2240/304* (2013.01); *F05D 2240/305* (2013.01); *F05D 2250/611* (2013.01); *F05D 2260/202* (2013.01); *Y02T 50/673* (2013.01); *Y02T 50/676* (2013.01)

(58) Field of Classification Search
CPC ... F01D 5/186; F01D 25/12; F06D 2240/304; F06D 2240/305; F06D 2250/61; F06D 2250/611; F06D 2260/202; F06D 2260/20255
USPC ................ 415/115, 173.1; 416/97 R; 60/752
See application file for complete search history.

(56) References Cited

U.S. PATENT DOCUMENTS

| | | | |
|---|---|---|---|
| 3,307,354 A * | 3/1967 | Macaulay et al. .............. 60/757 |
| 4,229,140 A * | 10/1980 | Scott ........................... 416/97 R |
| 4,726,104 A | 2/1988 | Foster et al. |
| 5,261,789 A * | 11/1993 | Butts et al. .................. 416/96 R |
| 5,997,251 A | 12/1999 | Lee |
| 6,258,226 B1 | 7/2001 | Conner |
| 2003/0068222 A1 | 4/2003 | Cunha et al. |
| 2010/0239409 A1 | 9/2010 | Draper |
| 2010/0329888 A1 | 12/2010 | Nadvit et al. |
| 2011/0103932 A1 | 5/2011 | Dueckershoff et al. |
| 2012/0288360 A1 * | 11/2012 | Kuwamura et al. ........ 415/173.1 |

OTHER PUBLICATIONS

International Searching Authority, PCT Notification of Transmittal of the International Search Report and the Written Opinion, Mar. 17, 2014, 10 pages.

* cited by examiner

*Primary Examiner* — Ninh H Nguyen
(74) *Attorney, Agent, or Firm* — Kinney & Lange, P.A.

(57) ABSTRACT

A turbomachinery component includes a surface exposed to hot working fluid flow. The surface has an undulating contour formed from a series of alternating protuberances and troughs. A set of three cooling outlets is associated with each trough.

19 Claims, 8 Drawing Sheets

TURBOMACHINERY COMPONENT COOLING SCHEME

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, and to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

An airfoil includes a suction surface and a pressure surface both extending axially between a leading edge and a trailing edge region, as well as radially from a root section of the airfoil to a tip section of the airfoil. A first protuberance and a second protuberance both extend axially along the pressure surface at the trailing edge region and are spaced apart by a trough. A primary cooling outlet is located in the trough. A first secondary cooling outlet is located on the first protuberance and a second secondary cooling outlet is located on the second protuberance. The first secondary cooling outlet and the second secondary cooling outlet are located upstream of the primary cooling outlet.

A component for a gas turbine engine includes an airfoil, bumps, and cooling holes. The airfoil includes a convex surface and a concave surface. Both the convex surface and the concave surface extend radially from a root section to a tip section and axially from a leading edge to a trailing edge. The bumps are located on the concave surface at the trailing edge and arranged into a column aligned parallel to a direction of working fluid flow. The bumps are axially elongated and radially spaced creating periodic depressions. Each depression is associated with a set of three cooling holes.

A turbomachinery component includes a surface exposed to hot working fluid flow. The surface has an undulating contour formed from a series of alternating protuberances and troughs. A set of three cooling outlets is associated with each trough.

DETAILED DESCRIPTION

Figure 1:
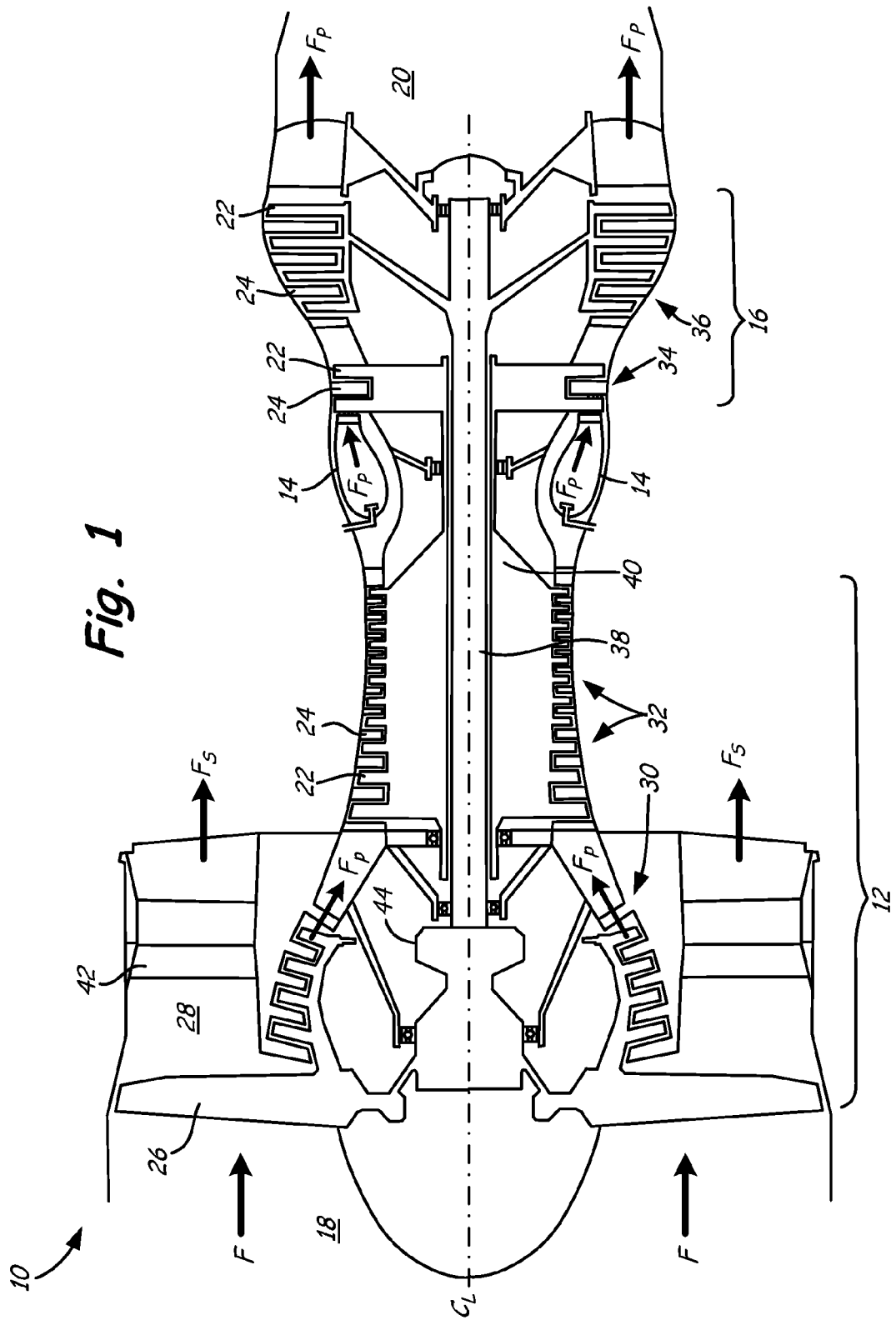
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
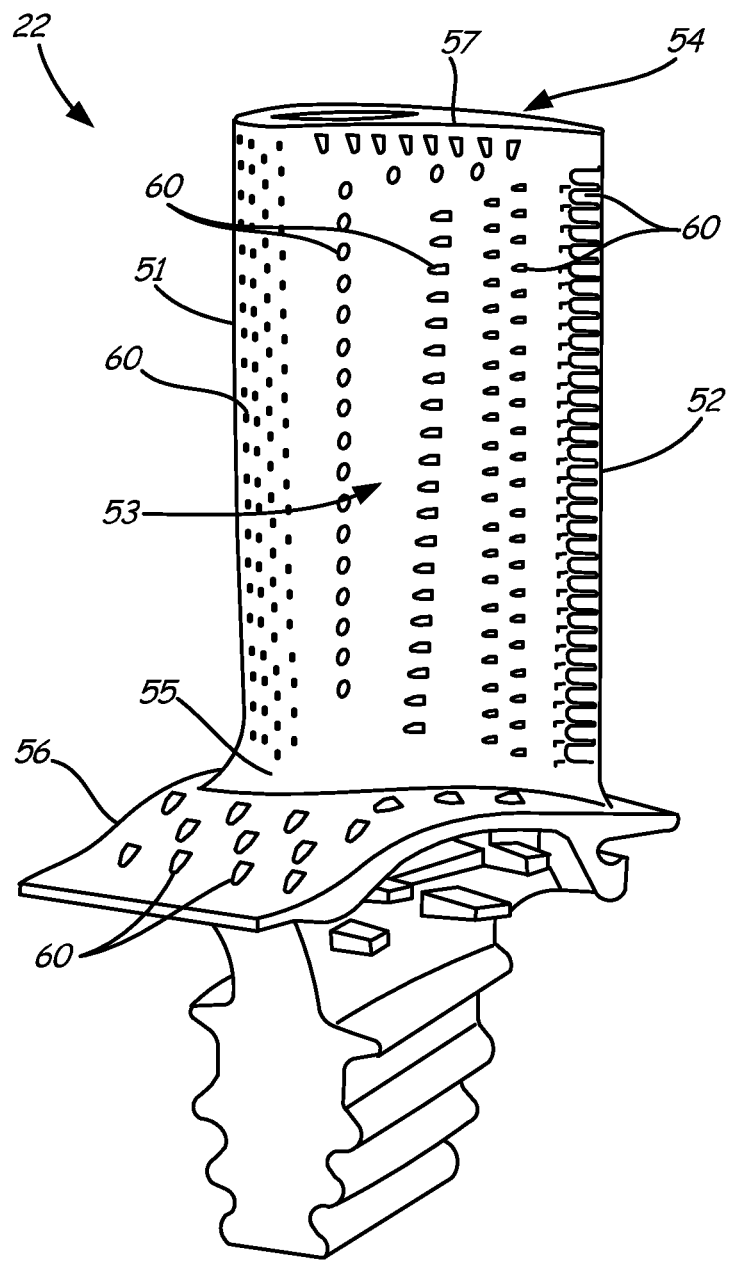
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
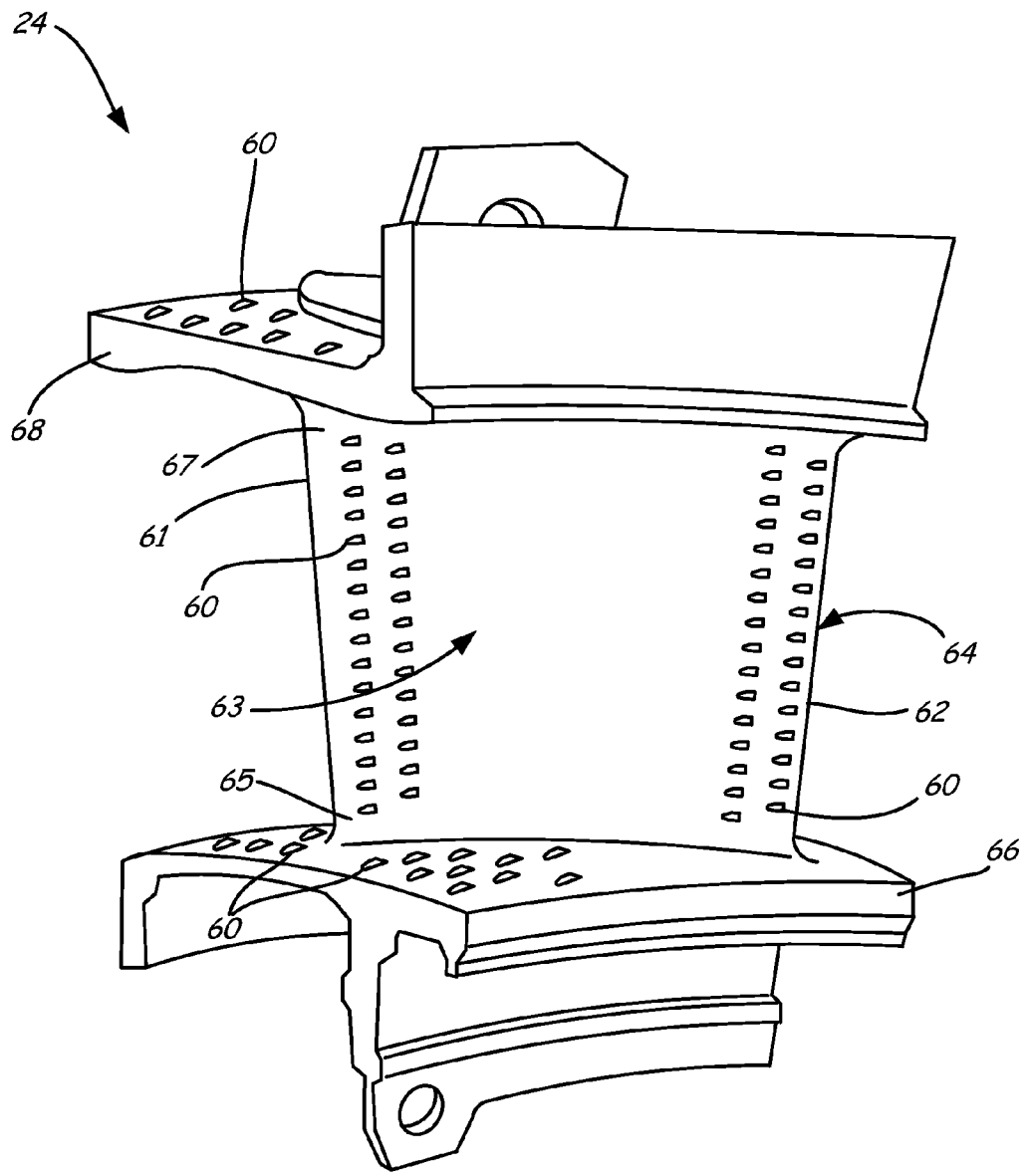
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

Figure 3:
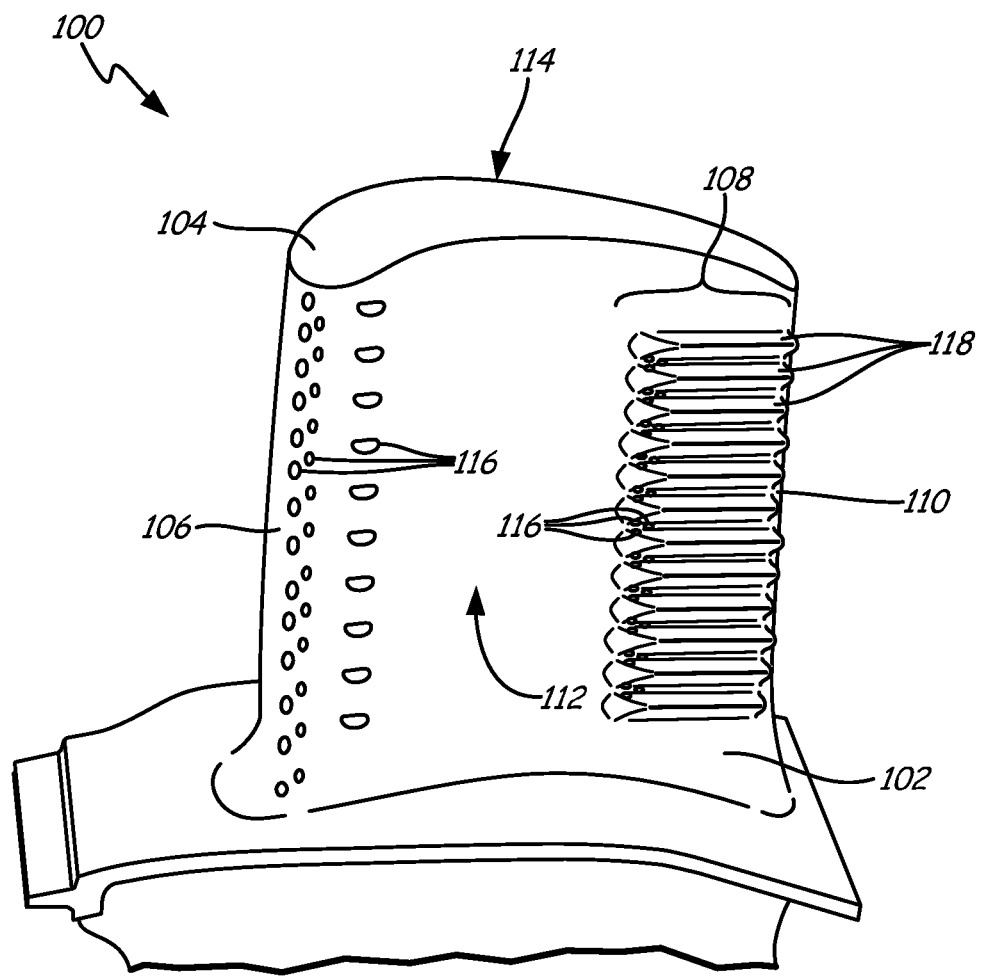
FIG. 3 is a perspective view of a rotor blade.

FIG. 3 is a perspective view of airfoil or rotor blade 100. Rotor blade 100 includes root section 102, tip section 104, leading edge 106, trailing edge section 108, trailing edge 110, pressure or concave surface (front) 112, suction or convex surface (back) 114, cooling holes or outlets 116, and protuberances 118. Cooling outlets 116 are located along leading edge 106 and trailing edge section 108 to provide a film of cooling air onto pressure surface 112 of rotor blade 100.

Rotor blade 100 is similar to rotor airfoil 22 described above with reference to FIG. 2A. Rotor blade 100 extends radially from an inner diameter (ID) or root section 102 to an outer diameter (OD) or tip section 104. Rotor blade 100 extends axially from leading edge 106 to trailing edge section 108, which terminates in trailing edge 110. Trailing edge 110 is located downstream of leading edge 106. Pressure surface 112 and suction surface 114 form the major opposing surfaces or walls of rotor blade 100. Pressure surface 112 and suction surface 114 both extend radially from root section 102 to tip section 104 and axially between leading edge 106 and trailing edge 110.

Columns of cooling outlets 116 extend radially from root section 102 to tip section 104 along pressure surface 112. In FIG. 3, several columns of cooling outlets 116 are located near leading edge 106 and a couple columns of cooling outlets 116 are located near trailing edge 110 in trailing edge region 108. Additional cooling outlets 116 are also possible on rotor blade 100 (e.g. see cooling outlets 60 on airfoil 22 of FIG. 2A). A column of protuberances 118 extends radially from root section 102 to tip section 104 along pressure surface 112 at trailing edge region 108. Each protuberance 118 extends axially along pressure surface 112 and terminates at trailing edge 110. Protuberances 118 are raised transversely from pressure surface 112 and give pressure surface 112 an undulating contour in trailing edge region 108.

As described with reference to FIGS. 2A and 2B, cooling fluid (e.g. compressor air) flows through cooling passageways within rotor blade 100. These cooling passageways terminate at cooling outlets 116, which deliver a thin layer or film of cooling fluid onto outer surfaces of rotor blade 100. In FIG. 3, this film of cooling fluid will protect pressure surface 112 from high temperature working air flow. In trailing edge region 108, protuberances 118 interact with cooling outlets 116 to facilitate the effectiveness of film cooling in this region.

Industry has required ever increasing efficiency from gas turbine engines to reduce fuel burn and operating costs. This has led to an increase in turbine inlet temperatures necessitating development of new and exotic methods of cooling gas path airfoil hardware. Proper cooling of the trailing edge of turbine airfoils remains a concern. This area of the airfoil poses a challenging cooling problem due to the aerodynamic drive for thinner trailing edges for aerodynamic efficiency. Traditional cooling methods have focused on internal convective cooling, trailing edge ejection, pressure side slot ejection, and material coatings. Though widely used and extremely effective, trailing edge and pressure side slot ejection utilize an extremely large amount of cooling air flow. In contrast with larger surface regions of the airfoil, traditional trailing edge slot cooling utilizes up to 1.5-3 times the cooling flow of the pressure or suction sides of the airfoil. While reducing slot size can add both flow and cooling benefit, smaller slot widths are manufacturing limited and greatly reduce airfoil casting yield.

Figure 4:
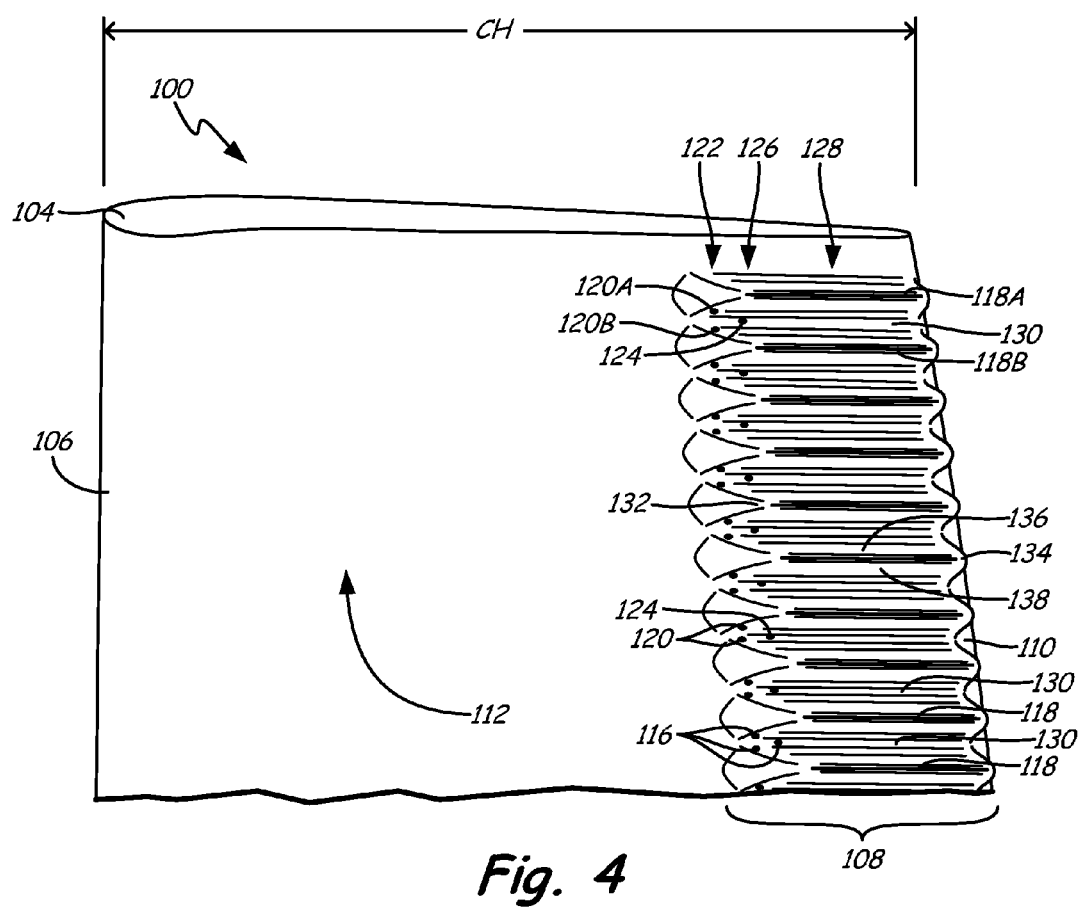
FIG. 4 is an enlarged perspective view of a trailing edge section of the rotor blade from FIG. 3.
Figure 5:
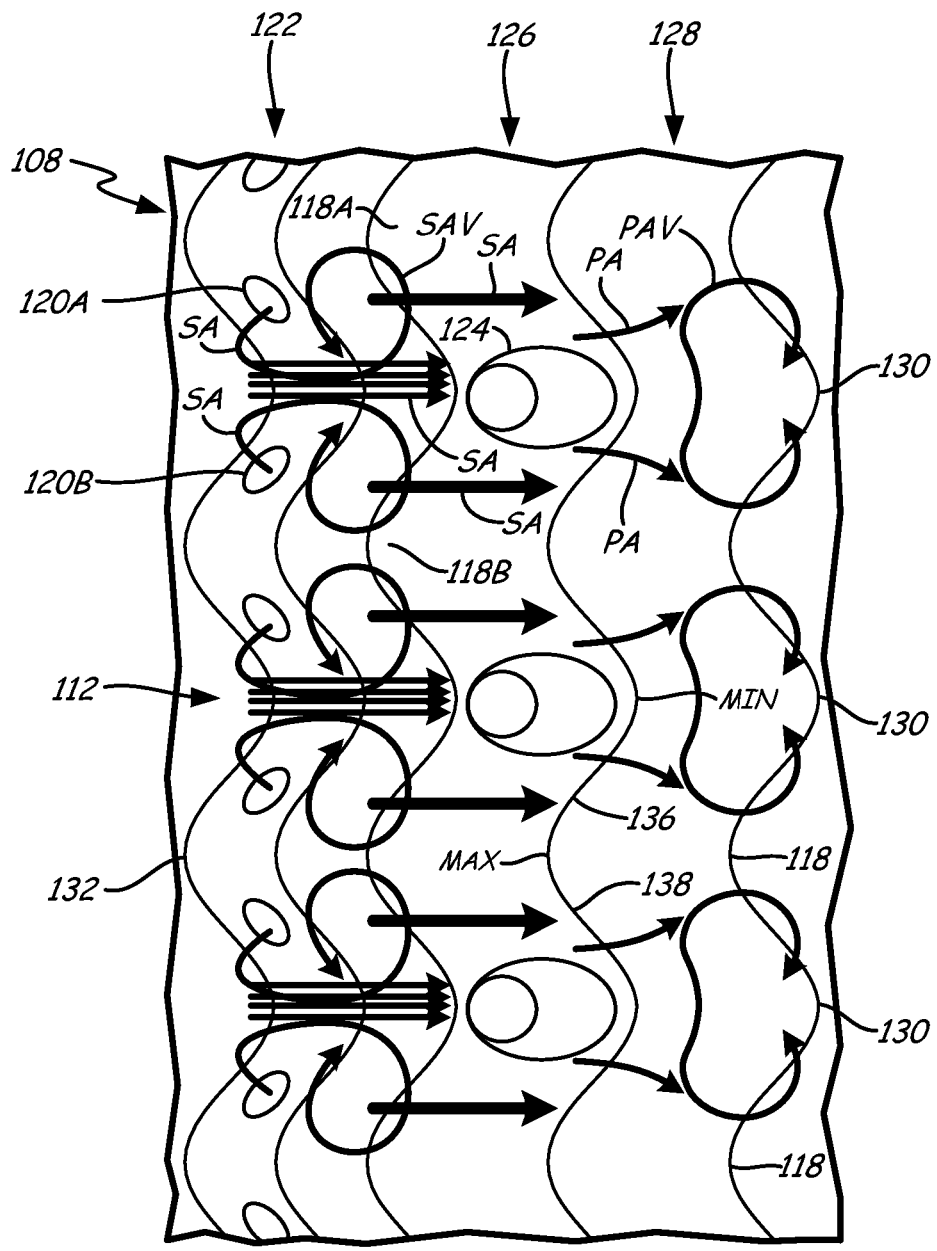
FIG. 5 is a schematic view of the trailing edge section of the rotor blade from FIGS. 3 & 4 showing fluid behavior.

As shown in FIGS. 3-5, the present disclosure proposes specially placed cooling outlets 116 and protuberances 118 to maximize cooling at trailing edge region 108 of rotor blade 100. The inclusion of protuberances 118 at trailing edge 110 may eliminate the need for trailing edge slot cooling and/or reduce the amount of cooling outlets 116 needed per square inch of cooling area. The combination of cooling outlets 116 and protuberances 118 will result in more effective film cooling that minimizes the amount of cooling air needed, increases overall turbine performance, and reduces metal operating temperatures. Lower operating costs and higher performance are expected. The detailed structure and function of cooling outlets 116 and protuberances 118 are discussed in detail below with reference to FIGS. 4-5.

FIG. 4 is an enlarged perspective view of trailing edge section 108 of rotor blade 100 from FIG. 3. Shown in FIG. 4 are elements of rotor blade 100 including tip section 104, leading edge 106, trailing edge section 108, trailing edge 110, pressure surface 112, cooling outlets 116, protuberances 118 and chord length CH. Cooling outlets 116 near leading edge 106 are removed for clarity, and cooling outlets 116 in trailing edge region 108 are further distinguished between secondary cooling outlets 120 arranged into first column 122 and primary cooling outlets 124 arranged into second column 126. Protuberances 118 are arranged into a third column 128 and are spaced apart by troughs 130. Each protuberance 118 has upstream end 132, downstream end 134, upper side 136, and lower side 138. Each protuberance 118 is associated with and a set of cooling holes 116 to affect the behavior of film cooling air in the location of trailing edge region 108.

As described above with reference to FIG. 3, pressure surface 112 of rotor blade extends axially between leading edge 106 and trailing edge region 108, which terminates in trailing edge 110. An airfoil (rotor blade 100) includes two surfaces, pressure surface 112 surface and suction surface 114, which are joined along leading edge 106 at incidence with the incoming flow and at trailing edge 110 at the confluence of the gas stream which contains a set of protuberances 118 and cooling outlets 116. The region of interest extends upstream of trailing edge 110 on both the suction and pressure sides and is denoted as trailing edge region 108 of the airfoil 100.

Chord length CH defines a length of airfoil 100 as measured by a straight line extending between leading edge 106 and trailing edge 110. Extending axially along trailing edge region 108 is a plurality of bumps or protuberances 118. Protuberances 118 extend axially along the final 10-40% of chord length CH and in the depicted embodiment, protuberances 118 extend axially along the final 25% of chord length CH.

Secondary cooling outlets 120 are arranged into first column 122 extending radially along pressure surface 112 at an upstream side of trailing edge region 108. Secondary cooling outlets 120 are organized into groups of two, such that first secondary cooling outlet 120A located on upper protuberance 118A is radially aligned with and facing second secondary cooling outlet 120B located on lower protuberance 118B. Primary cooling outlets 124 are arranged into second column 126 extending radially along pressure surface 112 just downstream of first column 122 in trailing edge region 108. A single primary cooling outlet 124 is located axially downstream of, and an equal radial distance between, first secondary cooling outlet 120A and second secondary cooling outlet 120B. This pattern repeats radially along pressure surface 112 with each primary cooling outlet 124 in second column 126 being associated with two secondary cooling outlets 120 (e.g. first secondary cooling outlet 120A and second secondary cooling outlet 120B) in first column 122. In other words, cooling outlets 116 are grouped into sets of three or a tri-set including one primary cooling outlet 124 and two secondary cooling outlets 120 in a triangular pattern.

Protuberances 118 are arranged into third column 128 extending radially along pressure surface 122 in trailing edge region 108. Each protuberance 118 is axially elongated and extends for about the full length of trailing edge region 108. Protuberances 118 have high points or crests that are arranged parallel to one another and are uniformly spaced axially by low points or troughs 130. Protuberances 118 and troughs 130 form an undulating contour for trailing edge region 108 having alternating maxima (i.e. maximum height of protuberance 118) and minima (i.e. minimum depression of trough 130). Each protuberance 118 includes upstream end 132, downstream end 134, upper side 136, and lower side 138. For any given protuberance, upstream end 132 is located opposite of downstream end 134, which is positioned at trailing edge 110 of rotor blade 100. Also for any given protuberance 118, upper side 136 is located closer to tip section 104 while lower side 138 is located closer to root section 102. In other words, lower side 138 of first protuberance 118A is connected to upper side 140 of second protuberance 118B by trough 130. Together, protuberances 118 and troughs 130 form radial sinusoidal contouring for pressure surface 112 at trailing edge region 108 that resembles a whale flipper.

Upstream end 132 of each protuberance 118 is sloped or inclined to gradually transition from substantially flat pressure surface 112 to maxima of protuberance 118. Downstream end 134 of each protuberance 118 is rounded. Both of upper side 136 and lower side 138 of each protuberance 118 are concave and curved to connect the minima of trough 130 to the maxima of protuberance 118. All of the trailing edge region 108 cooling outlets 116 are located toward the upstream end of trailing edge region 108. Primary cooling outlet 124 is located at the minima of trough 130 and placed equally between upstream ends 132 of first protuberance 118A and second protuberance 118B. First secondary cooling outlet 120A is located on upstream end 132 of first protuberance 118A between maxima of protuberance 118A and depression of trough 130. Similarly, second secondary cooling outlet 120B is located on upstream end 132 of second protuberance 118B between maxima of protuberance 118B and depression of trough 130. So positioned, secondary cooling outlets 120 and protuberances 118 increase the effectiveness of cooling air exiting primary cooling outlet 124

Two secondary cooling outlets 120 (e.g. first secondary cooling outlet 120A and second secondary cooling outlet 120B) are located upstream of a single primary cooling outlet 124. Accordingly, air exiting secondary cooling outlets 120 flows downstream to jointly affect air exiting primary cooling outlet 124. Protuberances 118 affect both air exiting secondary cooling outlets 120 and air exiting primary cooling outlet 124. Cooling outlets 116 (including secondary cooling outlets 120 and primary cooling outlet 120) introduce cooling air to flow axially along troughs 130 while protuberances 118 generate counter rotating vortices that force the cooling air down into troughs 130. The cooling film is more effectively utilized along trailing edge region 108 by preventing mixing or entrainment with hot working air flowing past pressure side 112. The structure and function of cooling outlets 116 and protuberances 118 are described further below with reference to FIG. 5.

FIG. 5 is a schematic view of trailing edge section 108 of rotor blade 100 from FIGS. 3 & 4 showing fluid behavior. Depicted in FIG. 5 are secondary cooling outlets 120 arranged into first column 122, primary cooling outlets 124 arranged into second column 126, and protuberances 118 arranged into third column 128 and separated by troughs 130. Each protuberance 118 has upstream end 132, upper side 136, and lower side 138. Maxima MAX and Minima MIN for the undulating contour of pressure side 112, as well as primary cooling air PA, primary cooling air vortex PAX, secondary cooling air SA, and secondary cooling air vortex SAV, are also shown.

In the depicted embodiment, protuberance height (i.e. distance from minima MIN to maxima MAX) is between about 30-40 mils (about 0.762-1.02 millimeters) and pitch is about 90 mils (about 2.29 millimeters). As shown in FIG. 5, primary cooling outlets 124 are located at minima MIN, while secondary cooling outlets 120 are located on protuberances 118 between maxima MAX and minima MIN. Secondary cooling outlets 120 can be located closer to maxima MAX of their respective protuberances 118 than minima MIN of their shared trough 130. Secondary cooling outlets 120 are relatively small (e.g. about 10-12 mils/0.254-0.305 millimeters) and can be circular in cross-section. Primary cooling outlets are relatively large (e.g. about 14-15 mils/0.356-0.381 millimeters) and can be circular or elliptical in cross-section. As discussed above with reference to FIG. 4, two secondary cooling outlets 120 (e.g. 120A and 120B) are located upstream of a single primary cooling outlet 124.

Secondary cooling air SA exits secondary cooling outlets 120 and flows downstream along trailing edge section 108. A portion of secondary cooling air SA will flow centrally along trough 130 in a jet while another portion of secondary cooling air SA forms secondary cooling air vortex SAV rotating counter-clockwise. Primary cooling air PA exits primary cooling outlet 124 and flows downstream along trailing edge section 108. Primary cooling air PA forms primary cooling air vortex PAV rotating clockwise, opposite to the spin of secondary cooling air SA. These counter-rotating vortices are generated by the contouring of pressure side 112 (e.g. protuberances 118 and troughs 130). The counter-rotating vortices energize fluid flow across cooling outlets 116 and convect downstream to mix within trough 130, thereby accelerating flow toward minima MIN and enhancing film cooling of trailing edge section 108.

Since secondary cooling air SA is ejected at a higher location (i.e. closer to maxima MAX), secondary cooling air vortex SAV is located above primary cooling air vortex PAV. Secondary cooling air vortex SAV acts as a buffer or barrier to hot working air passing by rotor blade 100 and prevents mixing or entrainment of primary cooling air PA with hot working air. Primary cooling air vortex PAV is forced to lie down and remain in trough 130 and recirculate along trough 130 to trailing edge 110, thereby providing more effective cooling of trailing edge region 108. Attachment of primary cooling air PA from primary cooling outlet 124 is also increased. The cool film buffer produced by cooling holes 116 and protuberances 118 would be utilized in lieu of trailing edge slots, and greatly diminish the cooling air demand of the airfoil.

The disclosed cooling scheme utilizing cooling holes 116 and protuberances 118 at trailing edge region 108 can provide the following benefits: 1) Reduce turbine metal operating temperatures through increased film effectiveness driving lower operating costs for the customer; 2) Minimize the amount of cooling air needed to film cool turbine parts increasing overall machine performance; and 3) Reduce the number of cooling holes needed per square inch of cooling area reducing part manufacturing costs.

The contouring of pressure surface 112 (i.e. protuberances 118 and troughs 130) could be manufactured either in the airfoil casting or added onto the part utilizing currently available ceramic coatings with the holes machined in. Cooling outlet 116 spacing and pattern reoccurrence can take many forms and will be driven by specific part configurations and operational needs. An alternate manufacturing process would be an all ceramic or CMC material. The combination of protuberances 118, troughs 130, and cooling outlets 120 and 124 as an effective film cooling scheme can be applied to any turbomachinery component exposed to hot working gas fluid flow as described below with reference to FIGS. 6 and 7.

Figure 6:
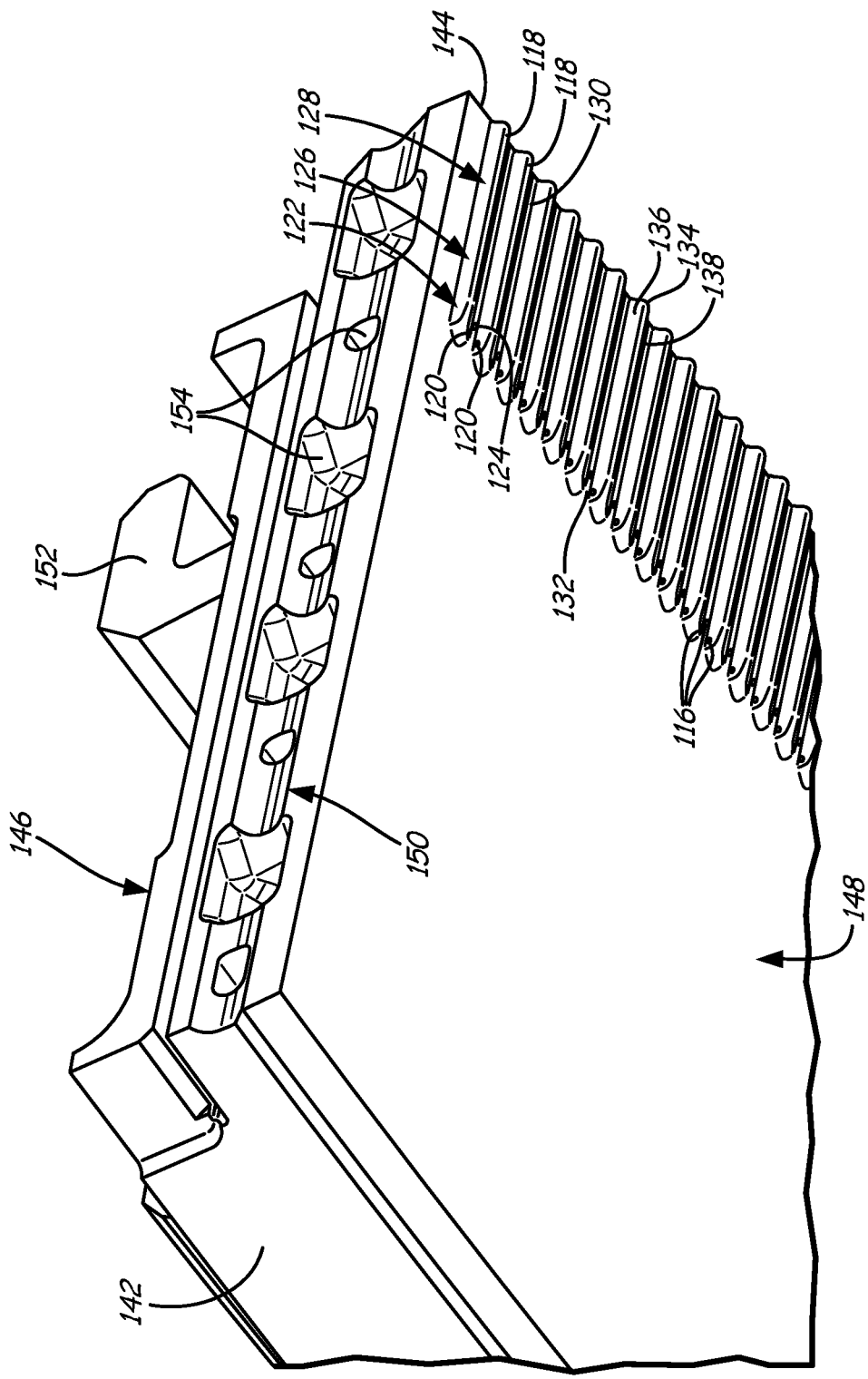
FIG. 6 is a perspective view of a turbine blade outer air seal having protuberances and cooling outlets.

FIG. 6 is a perspective view of blade outer air seal (BOAS) 140 having a cooling scheme similar to those described above. Shown in FIG. 6 are elements of BOAS 140 including upstream end 142, downstream end 144, outer surface 146, inner surface 148, end gap surface 150, hook 152, and cooling features 154. Also shown are secondary cooling outlets 120 arranged into first column 122, primary cooling outlets 124 arranged into second column 126, and protuberances 118 arranged into third column 128 and spaced apart by troughs 130. Each protuberance 118 has upstream end 132, downstream end 134, upper side 136, and lower side 138. Each protuberance 118 is associated with and a tri set of cooling holes 116 to affect the behavior of film cooling air in the location of inner surface 148 adjacent downstream end 144 of BOAS 140.

BOAS 140 (otherwise known as a turbine shroud) is positioned between the turbine blade tips and the turbine case. Outer surface 146 interfaces with the turbine case via hook 152. Inner surface 148 is located radially above the turbine blade tips and therefore, is exposed to hot working gases. A series of BOAS 140 are positioned next to one another at end gap surfaces 154, to form a 360 degree ring around the blade row.

Protuberances 118 extend from inner surface 148 of BOAS 140 into the hot gas path. Third column 128 of protuberances 118 extends along inner surface 148 adjacent downstream end 144 of BOAS 140. Secondary cooling outlets 120 and primary cooling outlets 124 are positioned on BOAS 140 in the same manner as set forth above with reference to FIGS. 4-5. Protuberances 118 are aligned to the flow of the hot working fluid such that they generate vortices that augment the tri-configured cooling holes 116 along the surface of the component. Accordingly, the cooling scheme of the present disclosure is used to cool downstream end 144 or aft portion of inner surface 148 of BOAS 140.

Figure 7:
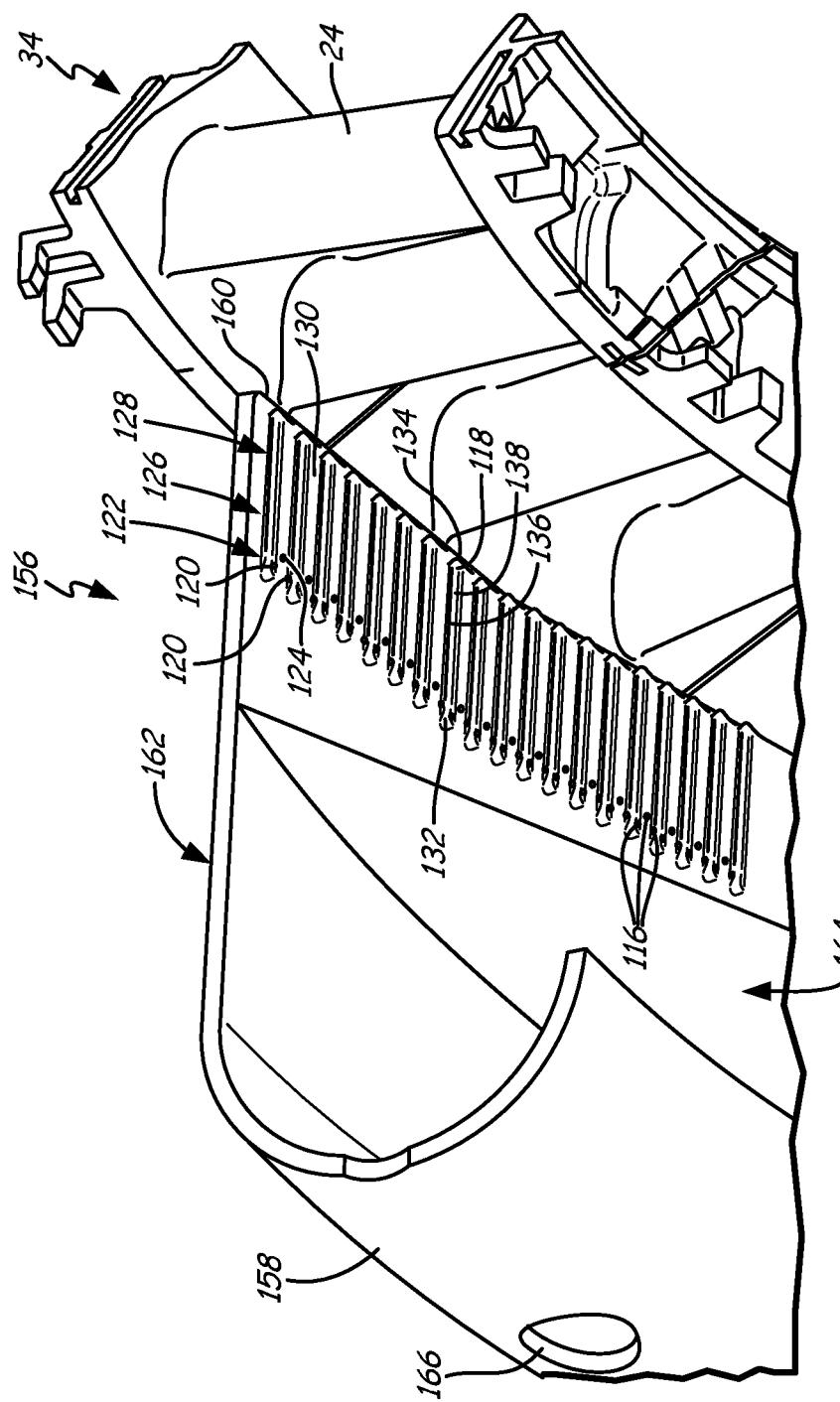
FIG. 7 is a perspective view of a combustor panel having protuberances and cooling outlets.

FIG. 7 is a perspective view of combustor panel 156 having a cooling scheme similar to those described above. Shown in FIG. 7 are elements of combustor panel 156 including upstream end 158, downstream end 160, outer surface 162, inner surface 164, and fuel nozzle slots 166. Also visible are first stage vanes 24 of HPT 34. Secondary cooling outlets 120 are arranged into first column 122, primary cooling outlets 124 are arranged into second column 126, and protuberances 118 are arranged into third column 128 and spaced apart by troughs 130. Each protuberance 118 has upstream end 132, downstream end 134, upper side 136, and lower side 138. Each protuberance 118 is associated with and a tri set of cooling holes 116 to affect the behavior of film cooling air in the location of inner surface 164 adjacent downstream end 160 of combustor panel 156.

Combustor panel 156 is located just upstream of first stage vanes 24 of HPT 34 Like BOAS 140, combustor panel 156 is a 360 degree ring that runs around the annulus of the combustor before it interfaces with HPT 34. Upstream end 158 has fuel nozzle slots 166 for supporting fuel nozzles, while downstream end 160 faces HPT 34. Inner surface 164 is exposed to hot working gases passing through combustor en route to HPT 34.

Protuberances 118 extend from inner surface 164 adjacent downstream end 160 into the hot gas path. Third column 128 of protuberances 118 extends along inner surface 164 adjacent downstream end 160 of combustor panel 156. Secondary cooling outlets 120 and primary cooling outlets 124 are associated with protuberances 118 in the same manner as set forth above with reference to FIGS. 4-5. Protuberances 118 are aligned to the flow of the hot working fluid such that they generate vortices that augment the tri-configured cooling holes 116. Accordingly, the cooling scheme of the present disclosure is used to cool downstream end 160 or aft portion of inner surface 164 of combustor panel 156, as well as the endwalls of first stage vanes 24. In other words, film cooling is provided to HPT 34 as well as combustor panel 156 when the cooling scheme is utilized at downstream end 160 of combustor panel 156.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

Discussion of Possible Embodiments

The following are non-exclusive descriptions of possible embodiments of the present invention.

An airfoil can include a suction surface and a pressure surface, both extending axially between a leading edge and a trailing edge region, as well as radially from a root region of the airfoil to a tip region of the airfoil. The airfoil can also include a first protuberance and a second protuberance both extend axially along the pressure surface at the trailing edge region and are spaced apart by a trough. The airfoil can include a primary cooling outlet located in the trough, a first secondary cooling outlet located on the first protuberance, and a second secondary cooling outlet located on the second protuberance. The first secondary cooling outlet and the second secondary cooling outlet are located upstream of the primary cooling outlet.

The airfoil of the preceding paragraph can optionally include, additionally and/or alternatively, any one or more of the following features, configurations and/or additional components:

the first protuberance and the second protuberance can be arranged in a radial column, which extends between the root section and the tip section;

the first secondary cooling outlet can be located at an upstream end of the first protuberance, and the second secondary cooling outlet can be located at an upstream end of the second protuberance;

the first secondary cooling outlet and the second secondary cooling outlet can be radially aligned;

downstream ends of the first protuberance and the second protuberance can be located at the trailing edge;

the first protuberance and the second protuberance can extend along approximately 10% to 40% of a chord length of the airfoil upstream of the airfoil trailing edge;

the primary cooling outlet can be elliptical in cross section; and/or the first secondary cooling outlet and the second secondary cooling outlet can be circular in cross section.

A component for a gas turbine engine can include an airfoil, bumps, and cooling holes. The airfoil can include a convex surface and a concave surface which both extend radially from a root section to a tip section and axially from a leading edge to a trailing edge. The bumps can be located on the concave surface at the trailing edge and arranged into a column aligned parallel to a direction of working fluid flow. The bumps can be axially aligned and radially spaced to create periodic depressions. Each depression can be associated with a set of three cooling holes.

The component of the preceding paragraph can optionally include, additionally and/or alternatively, any one or more of the following features, configurations and/or additional components:

the set of three cooling holes can include a first cooling hole located in the depression, a second cooling hole located on a first bump on a first side of the depression, and a third cooling hole located on a second bump on a second side of the depression;

the first cooling hole can be located axially downstream of both the second cooling hole and the third cooling hole;

the second cooling hole and the third cooling hole are radially aligned;

the first cooling hole can be larger than both the second cooling hole and the third cooling hole;

the second cooling hole and the third cooling hole can be about equal in size; and/or the bumps can be uniformly spaced in the column by the depressions.

A turbomachinery component can include a surface exposed to hot working fluid flow, the surface having an undulating contour formed from a series of alternating protuberances and troughs. A set of three cooling outlets can be associated with each trough.

The turbomachinery component of the preceding paragraph can optionally include, additionally and/or alternatively, any one or more of the following features, configurations and/or additional components:

the protuberances can be aligned parallel to the hot working fluid flow;

the protuberances can be elongated along a flow path of the hot working fluid flow;

each protuberance can have a tapered upstream end and a rounded downstream end;

one cooling outlet can be located in the trough;

the surface can be located on a blade outer air seal;

the surface can be located on a combustor panel; and/or the surface can be located on an airfoil.

The invention claimed is:

1. An airfoil comprising:
    a suction surface and a pressure surface both extending axially between a leading edge and a trailing edge region, as well as radially from a root section of the airfoil to a tip section of the airfoil;
    a first protuberance and a second protuberance both extending axially along the pressure surface at the trailing edge region, the first protuberance and the second protuberance spaced apart by a trough;
    a primary cooling outlet located in the trough; and
    a first secondary cooling outlet located on the first protuberance and a second secondary cooling outlet located on the second protuberance, wherein the first secondary cooling outlet and the second secondary cooling outlet are located upstream of the primary cooling outlet.

2. The airfoil of claim 1, wherein the first protuberance and the second protuberance are arranged in a radial column, which extends between the root section and the tip section.

3. The airfoil of claim 1, wherein the first secondary cooling outlet is located at an upstream end of the first protuberance, and the second secondary cooling outlet is located at an upstream end of the second protuberance.

4. The airfoil of claim 1, wherein the first secondary cooling outlet and the second secondary cooling outlet are radially aligned.

5. The airfoil of claim 1, wherein downstream ends of the first protuberance and the second protuberance are located at the trailing edge.

6. The airfoil of claim 1, wherein the first protuberance and the second protuberance extend along approximately 10% to 40% of a chord length of the airfoil upstream of the airfoil trailing edge.

7. The airfoil of claim 1, wherein the primary cooling outlet is elliptical in cross section.

8. The airfoil of claim 7, wherein the first secondary cooling outlet and the second secondary cooling outlet are circular in cross section.

9. A component for a gas turbine engine, the component comprising:
    an airfoil including a convex surface and a concave surface, both the convex surface and the concave surface extending radially from a root section to a tip section and axially from a leading edge to a trailing edge;
    a column of bumps located on the concave surface at the trailing edge and aligned parallel to a direction of working fluid flow, the bumps being axially elongated and radially spaced creating periodic depressions; and
    a set of three cooling holes associated with each depression wherein the set of three cooling holes includes a first cooling hole located in the depression, a second cooling hole located on a first bump on a first side of the depression, and a third cooling hole located on a second bump on a second side of the depression.

10. The component of claim 9, wherein the first cooling hole is located axially downstream of both the second cooling hole and the third cooling hole.

11. The component of claim 10, wherein the second cooling hole and the third cooling hole are radially aligned.

12. The component of claim 11, wherein the first cooling hole is larger than both the second cooling hole and the third cooling hole.

13. The component of claim 12, wherein the second cooling hole and the third cooling hole are about equal in size.

14. The component of claim 9, wherein the bumps are uniformly spaced in the column by the depressions.

15. A turbomachinery component comprising:
    a surface exposed to hot working fluid flow, the surface having an undulating contour formed from a series of alternating protuberances and troughs; and
    a set of three cooling outlets associated with each trough;
    wherein the surface is located on one of the group consisting of: a blade outer air seal and a combustor panel.

16. The component of claim 15, wherein the protuberances are aligned parallel to the hot working fluid flow.

17. The component of claim 15, wherein the protuberances are elongated along a flow path of the hot working fluid flow.

18. The component of claim 15, wherein each protuberance has tapered upstream end and a rounded downstream end.

19. The component of claim 15 wherein one cooling outlet is located in the trough.

* * * * *